C. P. HIGGINS.
PROCESS FOR MANUFACTURING HEADERS FOR WATER TUBE BOILERS.
APPLICATION FILED MAR. 23, 1908
1,064,217.
Patented June 10, 1913.
4 SHEETS—SHEET 4.
Fig. 16.
Fig. 17.
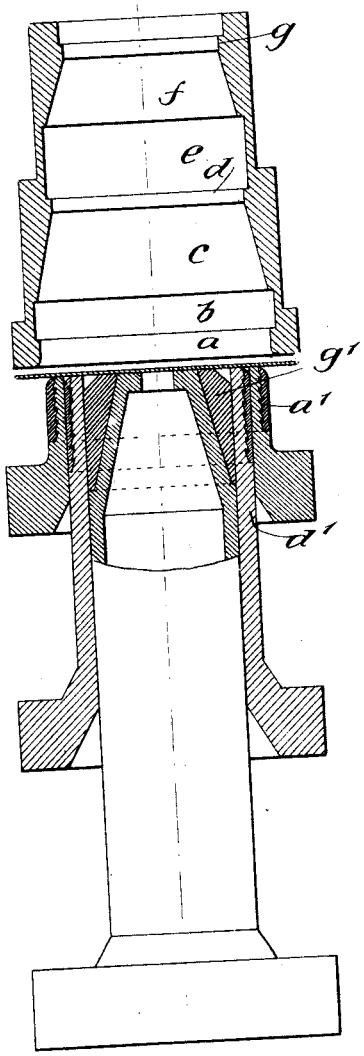
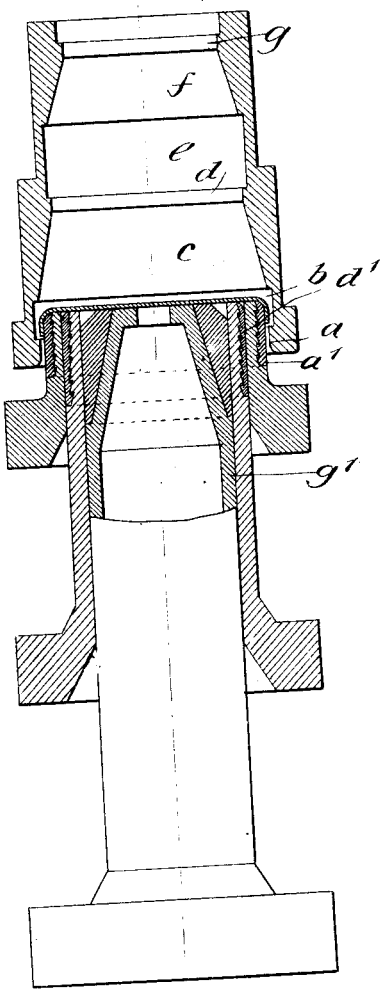
WITNESSES:
INVENTOR
Campbell P. Higgins
BY
Gifford & Bull
ATTORNEY

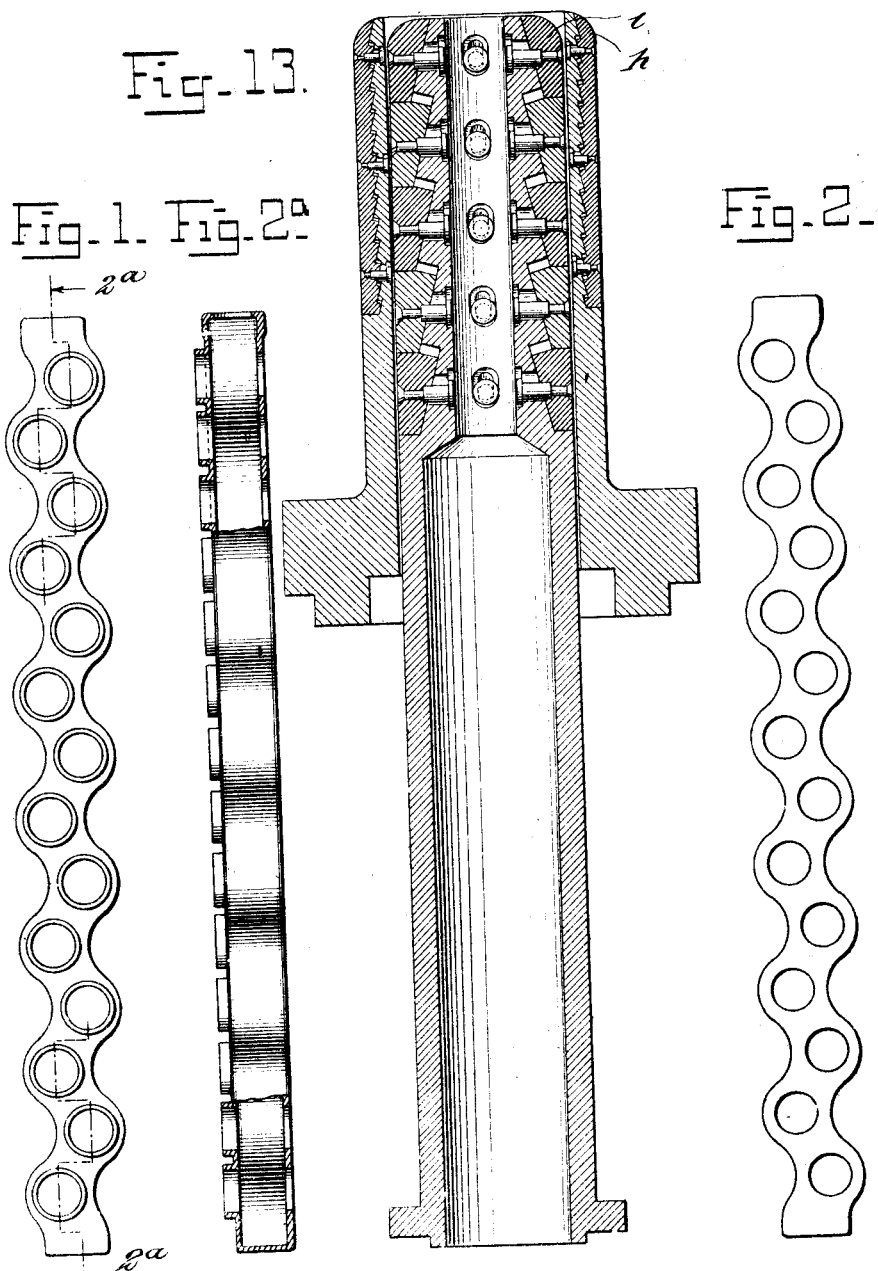

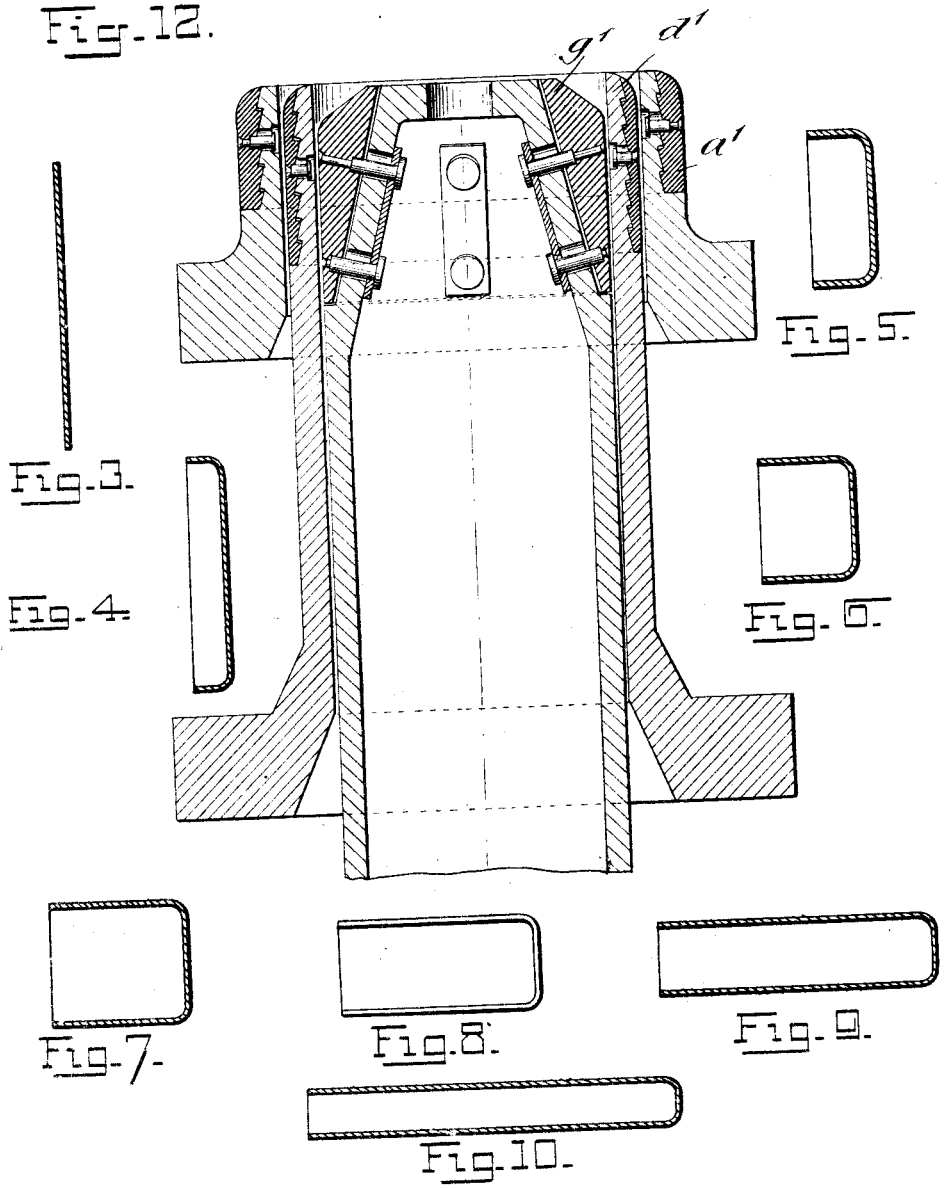

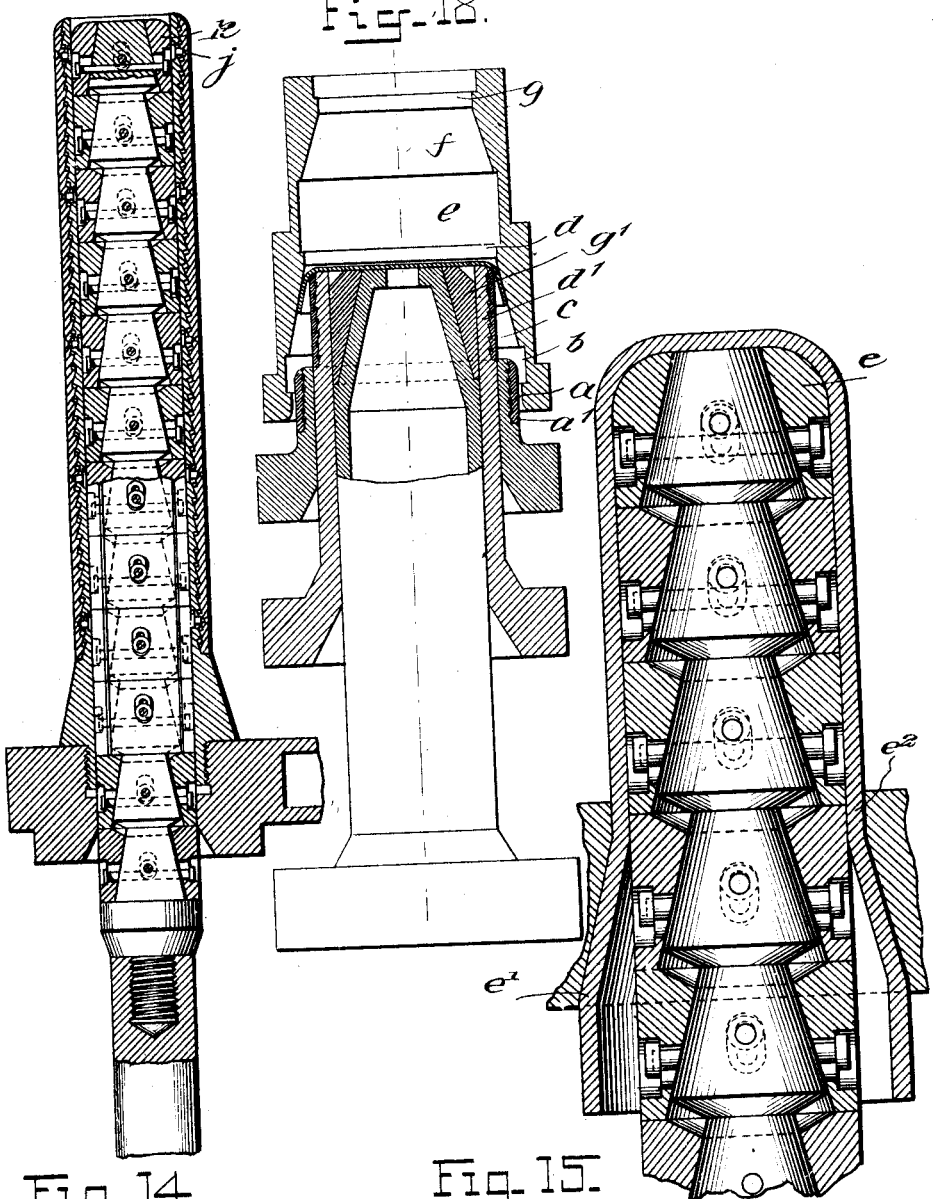

UNITED STATES PATENT OFFICE.

CAMPBELL P. HIGGINS, OF ROSELLE, NEW JERSEY, ASSIGNOR TO THE BABCOCK & WILCOX COMPANY, OF BAYONNE, NEW JERSEY, A CORPORATION OF NEW JERSEY.

PROCESS FOR MANUFACTURING HEADERS FOR WATER-TUBE BOILERS.

1,064,217.     Specification of Letters Patent.     Patented June 10, 1913.

Application filed March 23, 1908. Serial No. 422,595.

*To all whom it may concern:*

Be it known that I, CAMPBELL P. HIGGINS, a citizen of the United States, and a resident of Roselle, in the county of Union, and State of New Jersey, have invented a new and Improved Process for Manufacturing Headers for Water-Tube Boilers, of which the following is a specification.

On the 14th day of June, 1910, patents were granted to me as follows: for machine for forming seamless tubes, Nos. 961,128; 961,129; 961,130; 961,131; 961,132, and 961,133.

By the present application I desire to secure the process involved in the manufacture of wrought metal boiler headers.

In the method of manufacture which has survived for many years past, headers of this class have been welded; that is to say, have contained a welded seam extending longitudinally from end to end of the header and each end of the header has contained a welded closure; three separate pieces being employed in the make up of the header. The preferred process of manufacture has heretofore been to fold a blank around a mandrel until its edges lap; then to weld the lapped edges together into a welded seam extending from end to end; then, after it has been staggered, to insert a piece in each end and weld it so as to produce the welded closure at each end.

In my new article of manufacture, the side walls and ends are weldless and, at the same time, the metal is in that condition which results from forming without such substantial thinning as occurs in tube drawing.

In the accompanying drawings, Figure 1 is a view of the hand hole side of my new water tube boiler header complete in its preferred form. Fig. 2 is a view of the opposite side thereof. Fig. 2ª is an edge view partly in section in a plane through the axes of the hand holes. Figs. 3 to 11 inclusive, are longitudinal sections showing the development, while hot, of my new article through the various changes of form without substantial thinning from the flat disk to the weldless pocket or tube having one end closed which is ready to be made into the finished header by lateral pressure when hot. Fig. 12 is a longitudinal section of the multiple plunger of the multiple die (shown in Patent No. 961,129) of the first press, by which the transformations represented from Fig. 3 to Fig. 6 inclusive, are accomplished. Fig. 13 is a longitudinal section of the multiple plunger of the multiple die of the second press by which the transformations of Figs. 7 and 8 are accomplished. Fig. 14 is a longitudinal section of the multiple plunger of the multiple die of the third press by which the transformations of Figs. 9 and 10 are accomplished. Fig. 15 is a longitudinal section of the die and plungers shown in Patent No. 961,128 of the fourth press by which the transformation of Fig. 11 is accomplished. Figs. 16, 17, and 18, show the progress of the article in the first press through two successive matrices and the intervening space. The machines by which the article is squared and staggered may be of the same construction and operation as machines heretofore in use in the manufacture of welded seam headers and, therefore, do not require particular representation or description herein.

My process may be described as follows: I start with a circular steel disk ½ inch in thickness and 54 inches in diameter and throughout all the changes of form represented from Figs. 3 to 11 inclusive, this thickness remains substantially constant. This disk is composed of what is known commercially as a flanging quality of open hearth steel plate. This disk is first heated in a gas furnace to a uniform temperature of about 2200 F. at which temperature it is introduced into and passed through the multiple dies shown in Figs. 16, 17 and 18, occupying about 80 seconds in its passage. It is then reheated to a uniform temperature of about 2200 F. in the gas furnace and introduced into and passed through the two dies of the second press by the multiple plunger shown in Fig. 13, occupying about 45 seconds in its passage. It is then reheated in the gas furnace to a uniform temperature of about 2200 F. and introduced into and passed through the two dies of the third press by the multiple plunger shown in Fig. 14, occupying about 35 seconds in its passage. It is then reheated to about 2200 F. and passed through the die shown in Fig. 15 occupying about 20 seconds in its passage. The dies are all set in vertical position and the article passes upward through them and during its passage through each set of the dies a stream of cold water is kept playing onto the closed end of the article to prevent the end being punched out by the pressure of the plunger. As the article is forced through each matrix of the dies it has passed substantially out of control of the preceding matrix. The action in each matrix is essentially a transforming action as distinguished from a thinning action and the intention is that the space between matrix and plunger shall be adapted to produce the reduction in diameter without any such thinning of the metal as occurs in drawing operations where the thinning of the metal is depended on for producing the transformation. If the thrust of the plunger acts to thin the closed end at all, it is so slight as to be immaterial. The reduction in diameter and elongation throughout the series of passes is so gradual that, at the heat specified, the transformation is accomplished without substantial fluting or other deformation of the cylindrical form of the side walls of the article. I give the following as a concrete example of the series of degrees of reduction by which I have accomplished this result. Starting with a disk of the dimensions and material above named and employing the temperatures above mentioned, the external diameter and length produced by each press was approximately as follows: As it leaves the first press, diameter 30 inches, length 20 inches; as it leaves the second press, diameter 18 inches, length 39 inches; as it leaves the third press, diameter 10½ inches, length 71 inches; as it leaves the fourth press, diameter 8 inches, length 91 inches. These length measurements are exclusive of the irregular portion of the metal at the rear end. The article shown in Fig. 11 is next reheated to about 2200 F. and by rolls its side walls are pressed into parallelogram form while containing a mandrel. While still hot, the side walls are pressed in a suitable press into sinuous form while containing a sectional mandrel. It is then cooled and the side walls are bored. It is then heated to about 2200 F. and the hand holes are flanged by a machine known in the art. The open end of the article is next reheated to about 2000 F. and contracted by pressure till it is of the form shown in Fig. 2ᵃ. The article is now complete and constitutes, as a new article of manufacture, a water-tube boiler header, the side walls of which are substantially non-thinned and weldless, the ends being also weldless.

Apparatus suitable for producing the transformations from Fig. 3 to Fig. 11, inclusive may be described as follows: $a$ is the matrix which first acts upon the disk, its mouth is tapering and its body is cylindrical as shown. $a'$ is the plunger by which the disk is forced through and beyond it. $b$ is a clearance space slightly larger in diameter than the matrix $a$ and longer than the article formed by the matrix $a$. $c$ is a space in the form of the frustum of a cone, the sides of which taper inwardly at an angle of approximately 15° to the vertical. $d$ is the second matrix which is cylindrical and approximately ¾ the diameter of the matrix $a$. $e$ is the second clearance space somewhat larger in diameter than the matrix $d$ and longer than the length of article produced by matrix $d$. $d'$ is a plunger coöperating with the matrix $d$. The disk being placed on the plunger $a'$, as shown in Fig. 16, is forced by that plunger through the matrix $a$ into the position shown in Fig. 17 where the article is entirely within the clearance space $b$. Plunger $a'$ now stops and plunger $b'$ advances and by pressure upon the head of the article carries it off of the plunger $a'$ and into the conical space $c$ wherein the article assumes the conical form shown in Fig. 18, and wherein a clearance space still exists between the side wall or flange of the article and the plunger $d'$. I have discovered that under these conditions and at the heat prescribed and with an angle not exceeding about 15°, the diameter of the article may be reduced without substantially fluting the side wall or flange thereof. It is then forced by the plunger $d'$ through the matrix $d$ into the clearance space $e$ and in doing so is made cylindrical. It next receives its third reduction in diameter in the tapering space $f$ and matrix $g$ through which it is forced by the plunger $g'$; the plunger $d'$ having come to rest in the clearance space $e$. The presses after the first require the modifications shown in the construction of the plungers, because of the length that the article has attained. In the second press the plunger $h$ (Fig. 13) forces the article through a tapering space (15 degrees to the vertical) and through a matrix into a clearance space; then plunger $i$ forces it through another tapering space of similar angle and through a second matrix. In the third press, the plunger $j$ (Fig. 14) forces the article through a tapering space of similar angle and through a matrix into a clearance space; thence plunger $k$ forces it through another tapering space of similar angle and through a second matrix. In the fourth press plunger $l$ (Fig. 15) forces the article through the tapering space $l'$ of similar angle and through the matrix $l'$.

The acting surface of each plunger is made, as shown in Figs. 12, 13, 14 and 15, so as to be collapsed by the withdrawal of the article from it and these withdrawals are accomplished in the clearance spaces wherein each succeeding plunger, shoving against the head of the article, shoves the article off of the plunger previously in action.

The less than 25° angularity of the clearance and reduction spaces interposed between the successive matrices, and the limitation of the temperature to a red heat below welding produces the conditions whereby the metal is given adequate freedom of flow to permit of its transformation without rupture or fatal fluting. These spaces serve as spaces for the reduction of the head and as clearances for the flange. The clearance and angle in these reduction spaces afford the freedom and graduation whereby the enormous flow, backward and inward, of the thick refractory metal is attained without undue violence or strain.

Understanding my invention to be of great value and broad novelty, I do not wish to be understood as limited to details.

Having thus described my invention, I claim as new and desire to secure by Letters Patent:

1. The process of forming a boiler header which consists in subjecting a wrought metal plate of substantially the thickness of the metal of the header to successive transformations of the flange from a substantial cylinder to a cone of less than 25°, and then to a cylinder, while at a red heat substantially below welding heat, whereby the metal is permitted adequate freedom of flow.

2. The process of forming a boiler header which consists in subjecting a wrought metal plate of substantially the thickness of the metal of the header to successive transformations of the flange while unconfined, from a substantial cylinder to a cone of less than 25°, and then to a cylinder, while at a red heat substantially below welding heat, whereby the metal is permitted adequate freedom of flow.

3. The process of forming a boiler header which consists in subjecting a wrought metal plate of substantially the thickness of the metal of the header to successive transformations of the flange from a substantial cylinder to a cone and then to a cylinder, in dies having a conical clearance and reduction space of not more than 25° angularity, while at a red heat below welding heat, whereby the metal is permitted adequate freedom of flow.

4. The process of forming a boiler header which consists in transforming a wrought metal plate by a series of substantially non-thinning operations into a closed end tube without seam or weld, heating the blank between each operation of the series, cooling the closed end while the blank is being operated upon, and finally shaping the blank into header form.

In testimony whereof, I have hereunto signed my name in the presence of two subscribing witnesses.

CAMPBELL P. HIGGINS.

Witnesses:
August G. Pratt,
Albert H. Ireland.